United States Patent
Cui et al.

(10) Patent No.: US 11,541,555 B2
(45) Date of Patent: Jan. 3, 2023

(54) ROBOT WRIST STRUCTURE AND ROBOT

(71) Applicants: CLOUDMINDS (BEIJING) TECHNOLOGIES CO., LTD., Beijing (CN); INNFOS DRIVE (BEIJING) TECHNOLOGIES CO., LTD., Beijing (CN)

(72) Inventors: Haotian Cui, Beijing (CN); Xunge Yan, Beijing (CN); Cheng Luo, Guangxi (CN); William Xiao-qing Huang, Beijing (CN)

(73) Assignees: CLOUDMINDS (BEIJING) TECHNOLOGIES CO., LTD., Beijing (CN); CLOUDMINDS ROBOTICS CO., LTD., Shanghai (CN)

( * ) Notice: Subject to any disclaimer, the term of this patent is extended or adjusted under 35 U.S.C. 154(b) by 314 days.

(21) Appl. No.: 16/806,763

(22) Filed: Mar. 2, 2020

(65) Prior Publication Data
US 2020/0276720 A1 Sep. 3, 2020

(30) Foreign Application Priority Data
Mar. 1, 2019 (CN) .......................... 201910156933.2

(51) Int. Cl.
*B25J 17/02* (2006.01)
*B25J 9/10* (2006.01)

(52) U.S. Cl.
CPC ........... *B25J 17/0258* (2013.01); *B25J 9/102* (2013.01); *B25J 9/104* (2013.01)

(58) Field of Classification Search
CPC ........ B25J 17/0258; B25J 9/102; B25J 9/104; F16H 37/02
See application file for complete search history.

(56) References Cited

U.S. PATENT DOCUMENTS 6,722,178 B1 4/2004 Ito et al.
2011/0120255 A1* 5/2011 Chen .................... B25J 17/0258
901/29
(Continued)

FOREIGN PATENT DOCUMENTS

CN 101088721 A 12/2007
CN 101927498 A 12/2010
(Continued)

OTHER PUBLICATIONS

1st Office Action dated Jan. 19, 2021 by the JP Office; Appln.No. 2020032047.
(Continued)

*Primary Examiner* — Erin D Bishop
*Assistant Examiner* — Aimee Tran Nguyen

(57) ABSTRACT

A robot wrist structure includes: a case, a first motor, a second motor, a first transmission mechanism, a second transmission mechanism, a first driving bevel gear, a second driving bevel gear, a driven bevel gear, a retaining fame, and an output connecting member; wherein the first motor and the second motor are mounted on the case, the first driving bevel gear, the second driving bevel gear and the driven bevel gear are respectively rotatably mounted in the retaining frame, the first driving bevel gear and the second driving bevel gear are both in mesh with the driven bevel gear, the first motor is connected to the first driving bevel gear by the first transmission mechanism, the second motor is connected to the second driving bevel gear by the second transmission mechanism, and the output connecting member is fixedly connected to the driven bevel gear.

14 Claims, 4 Drawing Sheets

(56) References Cited

U.S. PATENT DOCUMENTS

2011/0154935 A1* 6/2011 Liu ..................... B25J 17/0283
74/490.04
2015/0122072 A1* 5/2015 Wu ......................... B23Q 5/10
901/25

FOREIGN PATENT DOCUMENTS

| CN | 101927498 B | * | 8/2011 | .......... B25J 17/0258 |
|----|-------------|---|--------|------------------------|
| CN | 102729258 A | | 10/2012 | |
| CN | 204546556 U | | 8/2015 | |
| CN | 205479213 U | | 8/2016 | |
| CN | 205479213 U | * | 8/2016 | |
| CN | 205592346 U | * | 9/2016 | |
| CN | 106078794 A | | 11/2016 | |
| CN | 106240764 A | | 12/2016 | |
| CN | 107379009 A | | 11/2017 | |
| CN | 107825415 A | | 3/2018 | |
| JP | H01150042 A | | 6/1989 | |
| JP | H05131388 A | | 5/1993 | |
| JP | 2001280445 A | | 10/2001 | |
| JP | 2002540951 A | | 12/2002 | |
| KR | 100788787 B1 | | 12/2007 | |
| KR | 20110075728 A | | 7/2011 | |

OTHER PUBLICATIONS

European search report and European search opinion dated Aug. 28, 2020; EP 20159688.9.
1st Office Action dated Jun. 2, 2020 by the CN Office; Appln.No. 201910156933.2.

* cited by examiner

ROBOT WRIST STRUCTURE AND ROBOT

CROSS-REFERENCE TO RELATED APPLICATIONS

This application claims priority to Chinese Patent Application No. 201910156933.2, filed with the Chinese Patent Office on Mar. 1, 2019, titled "ROBOT WRIST STRUCTURE AND ROBOT", the entire contents of which are incorporated herein by reference.

TECHNICAL FIELD

The present application relates to the field of robots, and in particular, relates to a robot wrist structure and a robot.

BACKGROUND

An industrial robot generally includes a plurality of robot arms, and various operations and functions are achieved by swinging of the robot arms. A robot wrist is a key component for achieving swinging of the robot arms. A traditional robot wrist mainly includes a wrist base and a wrist case. The wrist case is generally defined as a fork structure, and the wrist base may be rotatably mounted on a fork end of the wrist case. A plurality of driving mechanisms and reduction mechanisms are mounted in the wrist case, to drive the wrist base to side swing relative to the wrist case. The degree of freedom of the movement of the traditional robot wrist is limited to a side swinging direction.

SUMMARY

An embodiment of the present application provides a robot wrist structure. The robot wrist structure includes a case, a first motor, a second motor, a first transmission mechanism, a second transmission mechanism, a first driving bevel gear, a second driving bevel gear, a driven bevel gear, a retaining fame, and an output connecting member; wherein the first motor and the second motor are mounted on the case, the first driving bevel gear, the second driving bevel gear and the driven bevel gear are respectively rotatably mounted in the retaining frame, an axis of the first driving bevel gear is collinear with an axis of the second driving bevel gear and perpendicularly intersects an axis of the driven bevel gear, the first driving bevel gear and the second driving bevel gear are both in mesh with the driven bevel gear, the first motor is connected to the first driving bevel gear by the first transmission mechanism, the second motor is connected to the second driving bevel gear by the second transmission mechanism, and the output connecting member is fixedly connected to the driven bevel gear.

Another embodiment of the present application provides a robot. The robot includes the robot wrist structure as described above.

BRIEF DESCRIPTION OF THE DRAWINGS

The accompanying drawings herein are given for further understanding of the present application, constitute a part of the specification, and serve to illustrate the present application together with the exemplary embodiments below, construing no limitation to the present application. In the drawings.

REFERENCE NUMERALS AND DENOTATIONS THEREOF

Figure 1:
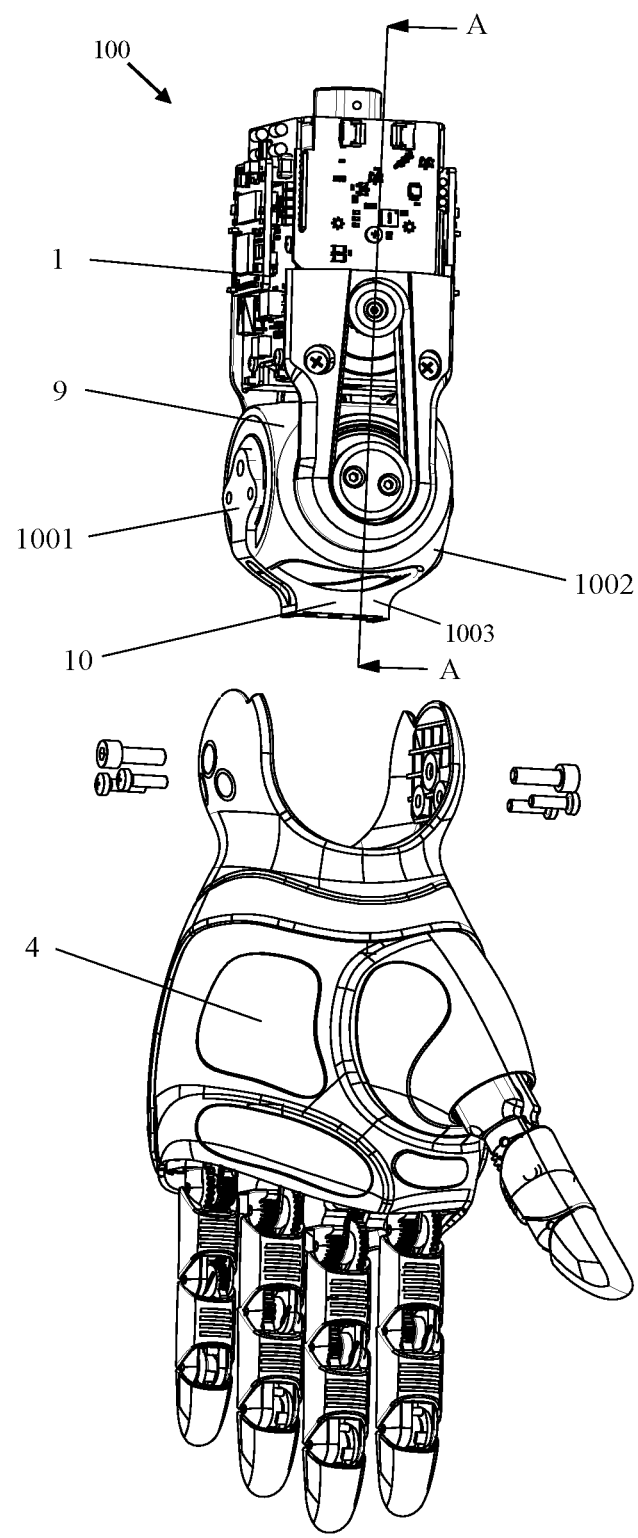
FIG. 1 is a schematic three-dimensional view of a robot wrist structure according to an embodiment of the present application, wherein a robot palm assembly is included.

100 Robot wrist structure
1 Case
101 First halve
102 Second halve
103 Boss
104 Groove
105 First strut
106 Second strut
107 Annular structure
2 First motor
3 Second motor
4 Robot palm assembly
5 Connecting member
6 First driving bevel gear
7 Second driving bevel gear
671 Inner end portion
672 Outer end portion
673 Gear portion
8 Driven bevel gear
81 Outer end
82 Second middle portion
9 Retaining frame
91 First mounting chamber
92 Second mounting chamber
93 Third mounting chamber 10 Output connecting member
1001 First fork branch
1002 Second fork branch
1003 First middle portion
11 Rotation shaft
111 Fifth bearing
112 Flange
12 First bearing
13 Second bearing
14 Third bearing
15 Fourth bearing
16 Bearing seat
17 Driving gear
18 Dual gear
19 Transmission gear
20 First sun gear
27 Input pulley
21 First planetary gear
22 First planetary carrier
28 Output pulley
23 Second sun gear
24 Second planetary gear
29 Transmission belt
25 Second planetary carrier
26 Ring gear (first ring gear and second ring gear)
32 Planetary rotation disc
30 First centering shaft 31 Second centering shaft
33 Transmission shaft
34 Press ring
35 Integrated circuit board
a1 Axis of first driving bevel gear
a2 Axis of second driving bevel gear
b Axis of driven bevel gear

DETAILED DESCRIPTION

The specific embodiments of the present application are described in detail hereinafter with reference to the accompanying drawings. It should be understood that the specific embodiments described herein are only intended to explain the present application instead of limiting the present application.

In case of no contrary description, the used terms "front", "rear", "left", "right", or the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present application.

Referring to FIG. 1 to FIG. 5, an embodiment of the present application provides a robot wrist structure 100. The robot wrist structure 100 includes a case 1, a first motor 2, a second motor 3, a first transmission mechanism, a second transmission mechanism, a first driving bevel gear 6, a second driving bevel gear 7, a driven bevel gear 8, a retaining fame 9, and an output connecting member 10. The first motor 2 and the second motor 3 are mounted on the case 1. The first driving bevel gear 6, the second driving bevel gear 7, and the driven bevel gear 8 are respectively rotatably mounted on the retaining frame 9. An axis a1 of the first driving bevel gear 6 is collinear with an axis a2 of the second driving bevel gear 7 and perpendicularly intersects an axis b of the driven bevel gear 8. The first driving bevel gear 6 and the second driving bevel gear 7 are both in mesh with the driven bevel gear 8. The first motor 2 is connected to the first driving bevel gear 6 by the first transmission mechanism. The second motor 3 is connected to the second driving bevel gear 7 by the second transmission mechanism. The output connecting member 10 is fixedly connected to the driven bevel gear 8.

When rotating in the same direction and at the same speed, the first motor 2 and the second motor 3 may drive, by the first transmission mechanism and the second transmission mechanism, the first driving bevel gear 6 and the second driving bevel gear 7 to rotate on the retaining frame 9 in the same direction and at the same speed. Since the first driving bevel gear 6 and the second driving bevel gear 7 are both in mesh with the driven bevel gear 8, meshing of the gears enables the driven bevel gear 8 to be tightly clamped and stopped from rotating about an axis b. Due to driving forces of the first motor 2 and the second motor 3, the first driving bevel gear 6 and the second driving bevel gear 7 apply a force perpendicular to the axis of the driven bevel gear 8, such that the driven bevel gear 8 drives the retaining frame 9 and the output connecting member 10 to rotate about the axis a1, and thus the side swinging movement of the robot wrist about the axis a1 is achieved.

When rotating in different directions and at the same speed, the first motor 2 and the second motor 3 may drive, by the first transmission mechanism and the second transmission mechanism, the first driving bevel gear 6 and the second driving bevel gear 7 to rotate on the retaining frame 9 in different directions and at the same speed, such that the driven bevel gear 8 is driven to rotate about the axis b; in this case, the retaining frame 9 is stationary, and the driven bevel gear 8 drives the output connecting member 10 to rotate about the axis b, such that the pitching movement of the robot wrist about the axis b is achieved.

When rotating in the same direction and at different speeds or in different directions and at different speeds, the first motor 2 and the second motor 3 may drive, by the first transmission mechanism and the second transmission mechanism, the first driving bevel gear 6 and the second driving bevel gear 7 on the retaining frame 9 to rotate in the same direction and at different speeds or in different directions and at different speeds, such that the driven bevel gear 8 is driven to differentially rotate, and thus the driven bevel gear 8 not only drives the retaining frame 9 and the output connecting member 10 to rotate about the axis a1, but also drives the output connecting member 10 to rotate about the axis b. In this way, the coupling movement between the side swinging movement of the robot wrist about the axis a1 and the pitching movement of the robot wrist about the axis b is achieved.

According to the movement process as described above, by differential cooperation between the first driving bevel gear 6 and the second driving bevel gear 7, and the driven bevel gear 8, the robot wrist structure 100 according to the embodiment of the present application may achieve various movement modes of the robot wrist structure 100, such as, pitching, side swinging, coupling, or the like. This increases the flexibility of the robot wrist structure 100, and enlarges the operating range of the robot wrist structure 100.

Figure 4:
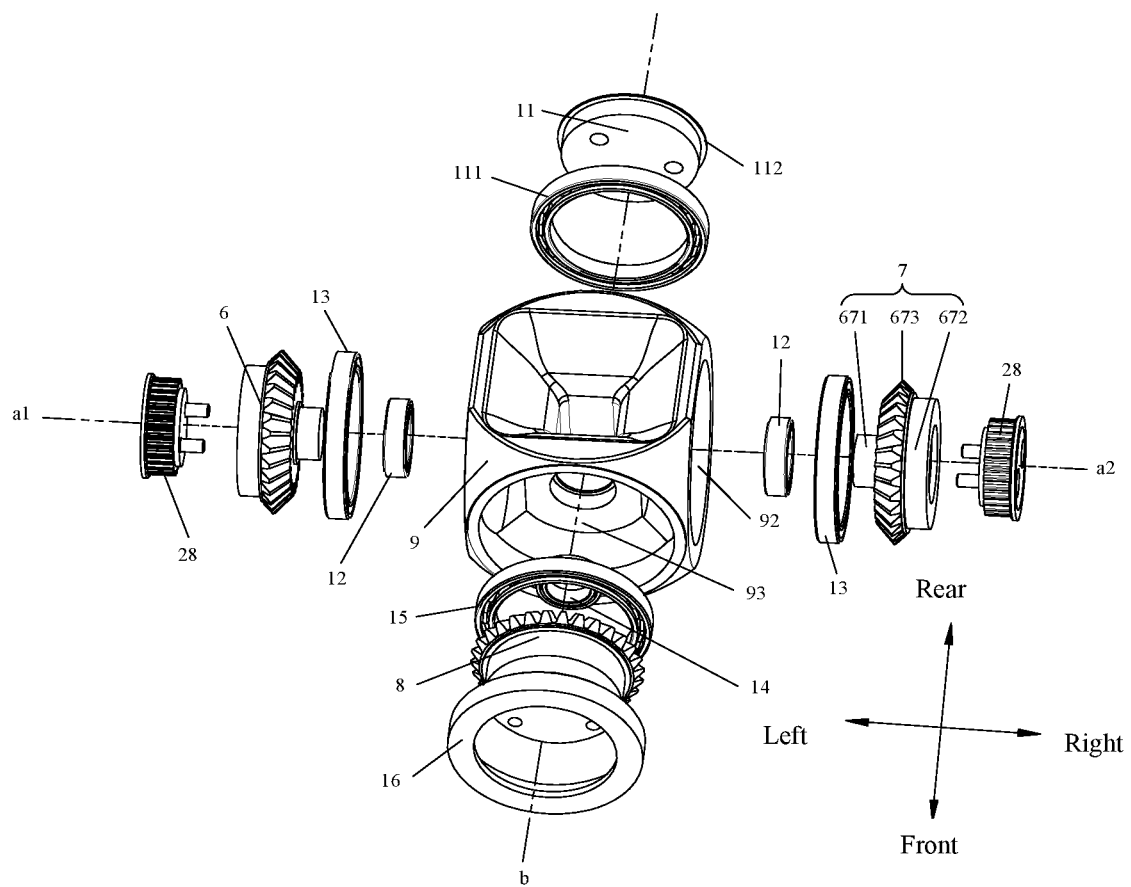
FIG. 4 is a schematic exploded view of a retaining frame and inner parts thereof according to an embodiment of the present application.

Further, as illustrated in FIG. 1 and FIG. 4, in the embodiment of the present application, the output connecting member 10 is a U-shaped fork structure, and the output connecting member 10 includes a first middle portion 1003, a first fork branch 1001 and a second fork branch 1002 that extend parallelly from both ends of the first middle portion 1003 and are oppositely disposed, and the retaining frame 9 is disposed between the first fork branch 1001 and the second fork branch 1002. A plurality of mounting holes are defined at end portions of the first fork branch 1001 and the second fork branch 1002, for example, three mounting holes spacedly disposed to a triangular shape. However, the embodiment herein sets no limitation to the number of mounting holes and the shape thereof. Holes matching with the mounting holes are defined on the driven bevel gear 8. The first fork branch 1001 is fixedly connected to the driven bevel gear 8, for example, by a fastener such as a bolt, a rivet, a pin, or the like. The second fork branch 1002 is rotatably connected to the retaining frame 9.

The output connecting member 10 may be configured to mount an operating terminal of the robot. For example, a robot palm assembly 4 may be mounted on the output connecting member 10, and the robot palm assembly 4 is driven by the output connecting member 10 to rotate about the axis a1 and/or axis b, such that a side swinging movement and a pitching movement of the robot palm assembly are achieved, and the flexibility is high. Optionally, in another implementation, the output connecting member 10 may be further connected to other structures, such as, a next-stage arm or the like, which is not limited in the present application.

In an optional implementation, as illustrated in FIG. 4, the robot wrist structure 100 may further include a rotation shaft 11 and a fifth bearing 111. The rotation shaft 11 is rotatably mounted in the retaining frame 9 by the fifth bearing 111, and a flange 112 configured to stop the fifth bearing 111 may be defined at an outer end periphery of the rotating shaft 11. This prevents the fifth bearing 111 from detaching from the retaining frame 9. An axis of the rotation shaft 11 is collinear with the axis b of the driven bevel gear 8, and the axis of the rotation shaft 11 and the axis b of the driven bevel gear 8 are respectively disposed on both sides of the retaining frame 9. Holes matching with mounting holes in the second fork branch 1002 may be defined on an outer end face of the rotation shaft 11, such that the second fork branch 1002 may be fixedly connected to the rotation shaft 11 by a fastener such as a bolt, a rivet, a pin, or the like.

Figure 2:
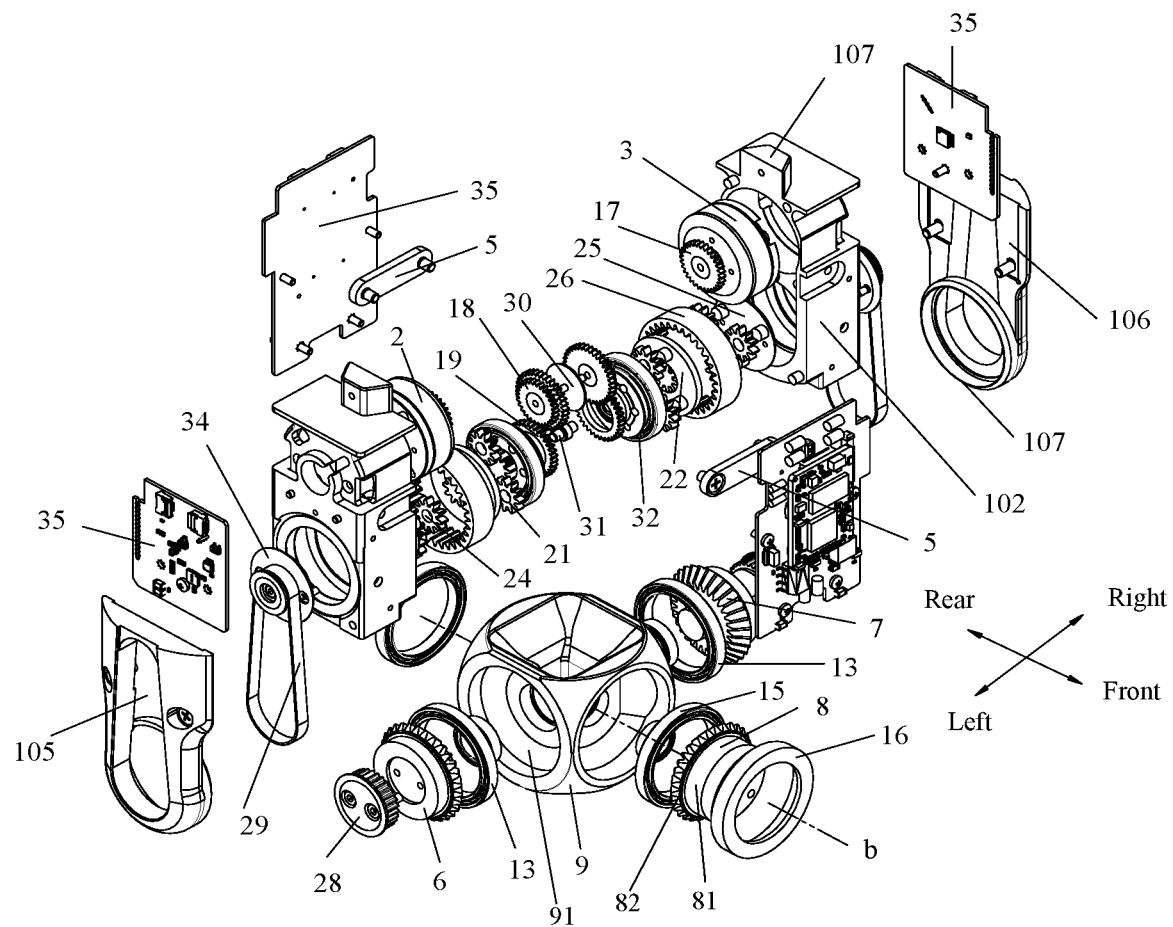
FIG. 2 is a schematic exploded view of the robot wrist structure according to an embodiment of the present application.
Figure 3:
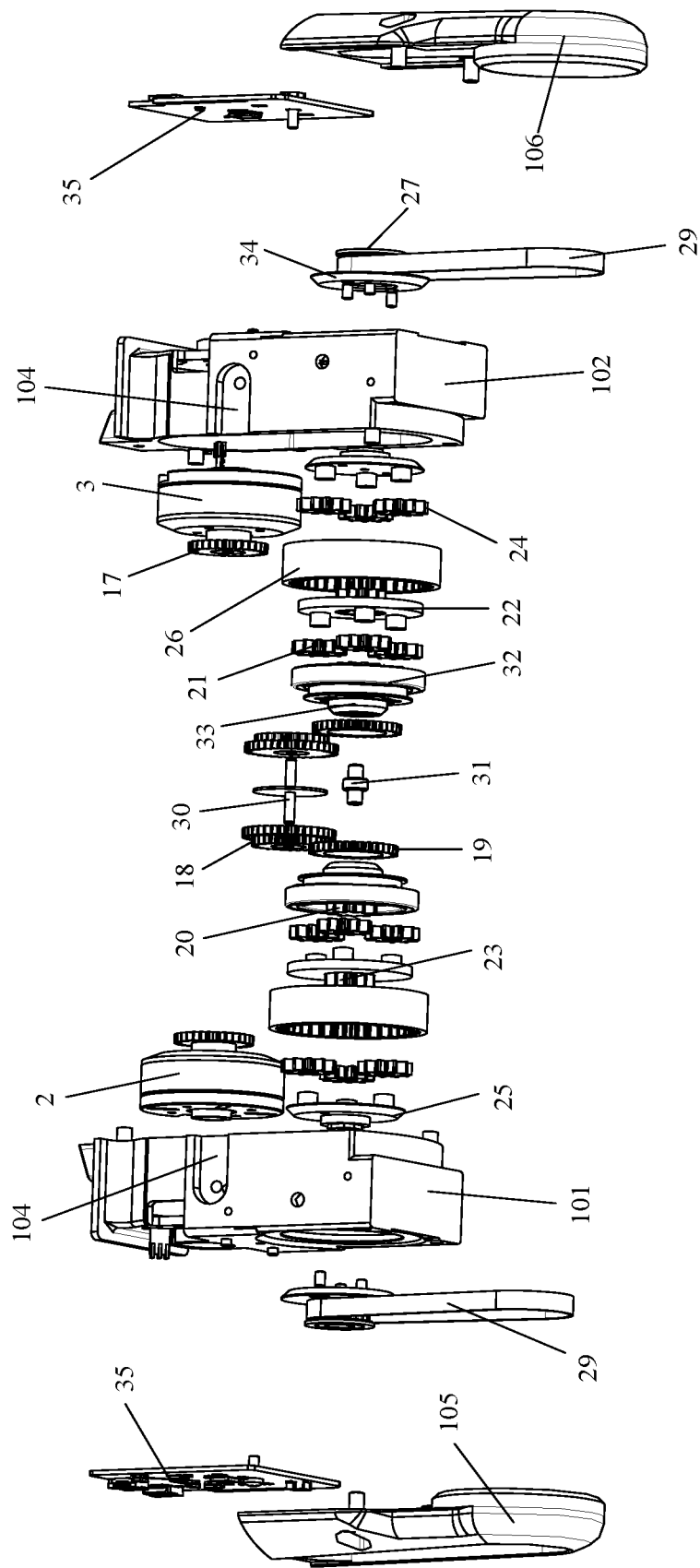
FIG. 3 is a schematic exploded view of a transmission mechanism and a case of the robot wrist structure according to an embodiment of the present application.

Further, the retaining frame 9 may be in a shape of hexahedron, a first mounting chamber 91 (as shown in FIG. 2) that is inwardly recessed is defined on a left side face of the retaining fame 9, a second mounting chamber 92 that is inwardly recessed is defined on a right side face of the retaining frame 9, a third mounting chamber 93 that is inwardly recessed is defined on a front side face of the retaining frame 9, and a fourth mounting chamber (not illustrated in the drawing) that is inwardly recessed is defined on a rear side face of the retaining frame. The first driving bevel gear 6 is disposed in the first mounting chamber 91, the second driving bevel gear 7 is disposed in the second mounting chamber 92, the driven bevel gear 8 is disposed in the third mounting chamber 93, and the rotation shaft 11 is disposed in the fourth mounting chamber.

Figure 5:
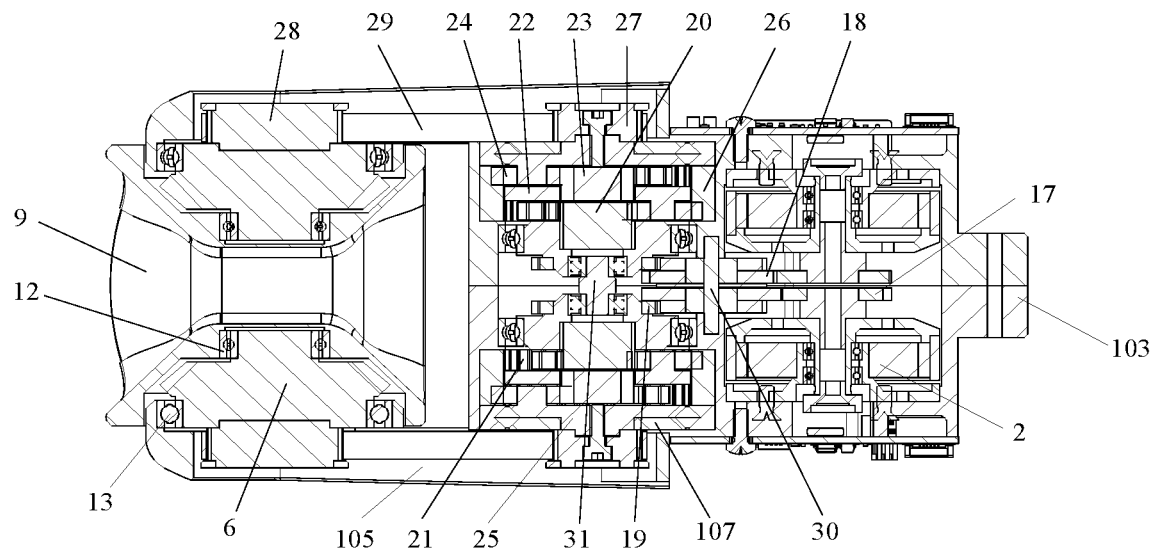
FIG. 5 is a sectional view of the robot wrist structure taken along an A-A line in FIG. 1.

Specifically, as illustrated in FIG. 2, FIG. 4, and FIG. 5, each of the driving bevel gears 6 and 7 includes an inner end portion 671 which is proximal to a center of the retaining frame 9, an outer end portion 672 which is distal from the center of the retaining frame 9, and a gear portion 673 which is disposed between the inner end portion 671 and the outer end portion 672. The inner end portion 671 and the outer end portion 672 are each defined as a cylindrical structure, and a diameter of the inner end portion 671 is less than a diameter of the outer end portion 672. The gear portion 673 is defined as a conical structure, and a diameter of the gear portion 673 is gradually decreased from the outer end portion 672 to the inner end portion 671. Optionally, the inner end portions 671, the outer end portions 672, and the gear portions 673 of the driving bevel gears 6 and 7 are integrally disposed in the first mounting chamber 91 and the second mounting chamber 92. The inner end portions 671 are disposed at the positions, which are proximal to the center of the retaining frame 9, in the first mounting chamber 91 and the second mounting chamber 92 by a first bearing 12. The outer end portions 672 are mounted on the case 1 by a second bearing 13, wherein an annular structure 107 sleeved onto the second bearing 13 is defined in the case 1, and the annular structure 107 may extend into the first mounting chamber 91 and the second mounting chamber 92. This makes an entire structure more compact, and reduces the space occupied by the entire structure.

Similarly, the driven bevel gear 8 includes an inner end which is proximal to the center of the retaining frame 9, an outer end 81 which is distal from the center of the retaining frame 9, and a second middle portion 82 which is disposed between the inner end and the outer end 81. The inner end and the outer end 81 are each defined as a cylindrical structure and a diameter of the inner end is less than a diameter of the outer end 81. Gears are defined at the second middle portion 82, and the second middle portion 82 is defined as a bevel gear shape, which is gradually decreased from the outer end 81 to the inner end. The inner end is mounted at the position in the third mounting chamber 93 which is proximal to the center of the retaining frame 9, and the outer end 81 is mounted on the retaining frame 9 by a fourth bearing 15. Optionally, the fourth bearing 15 may be fixed on an inner wall of the retaining frame 9 by a bearing seat 16. The bearing seat 16 is configured to stop and seal the fourth bearing 15, and may be fixed on an inner wall of the retaining frame 9 in an engagement or bonding fashion, which is not limited to these fashions. For example, in some other embodiments of the present application, the bearing seat 16 and the retaining frame 9 may be integrally formed.

As illustrated in FIG. 2 to FIG. 5, in the embodiment of the present application, the first transmission mechanism and the second transmission mechanism have the same structure, and may be disposed in the case 1 by mirroring, such that the motors 2 and 3 synchronously drive the driving bevel gears 6 and 7. Each of the transmission mechanisms includes a gear transmission mechanism and a belt transmission mechanism, and the motors 2 and 3 drive, by the gear transmission mechanisms and the belt transmission mechanisms in sequence, the driving bevel gears 6 and 7 to rotate.

Specifically, the gear transmission mechanism includes a driving gear 17, a dual gear 18, a transmission gear 19, a first planetary gear system, and a second planetary gear system. The dual gear 18 includes a small gear portion and a larger gear portion. The first planetary gear system includes a first sun gear 20, a first planetary gear 21, a first planetary carrier 22, and a first ring gear. The second planetary gear system includes a second sun gear 23, a second planetary gear 24, a second planetary carrier 25, and a second ring gear. Optionally, in the embodiment of the present application, the first planetary gear system and the second planetary gear system may be integrally formed to a ring gear 26.

The belt transmission mechanism includes an input pulley 27, an output pulley 28, and a transmission belt 29 which is disposed around on the input pulley 27 and the output pulley 28.

Specific connections between the gear transmission mechanism and the belt transmission mechanism are described hereinafter with reference to FIG. 1 to FIG. 5.

The driving gear 17 is connected to an output shaft of the motor 2 or 3, and the dual gear 18 is rotatably mounted in the case 1. The robot wrist structure 100 may further include a first centering shaft 30 and a second centering shaft 31. A separation tray that extends along a radial direction is defined at each of neutral positions of the first centering shaft 30 and the second centering shaft 31. Both ends of the first centering shaft 30 are respectively fixed to the inner wall of the case 1. The dual gear 18 is mounted on both sides of the separation tray of the first centering shaft 30 respectively. The driving gear 17 is in mesh with the small gear portion of the dual gear 18, and the larger gear portion of the dual gear 18 is in mesh with the transmission gear 19.

The transmission gear 19 is connected to the first sun gear 20. In an optional implementation, the transmission gear 19 may be defined as an outer ring gear structure, the first planetary system may further include a planetary rotation disc 32 and a transmission shaft 33, wherein the transmission shaft 19 is sleeved onto the transmission shaft 33, and drives the transmission shaft 33 to rotate. Optionally, the planetary rotation disc 32, the transmission shaft 33, and the first sun gear 20 may be integrally formed to reduce the number of parts. The first planetary gear 21 is maintained around the first sun gear 20 by the first planetary carrier 22 and the first ring gear. The first planetary carrier 22 and the second sun gear 23 are fixedly connected or integrally formed. The second planetary gear 24 is maintained around the second sun gear 23 by the second planetary carrier 25 and the second ring gear. The first ring gear and the second ring gear are fixed to the case 1. The other side of the second planetary carrier 25 is connected to the input pulley 27 by a fastener, such as a bolt or the like. The input pulley 27 is connected to the output pulley 28 by the transmission belt 29. The output pulley 28 is connected to the driving bevel gears 6 and 7 by a fastener, such as a bolt or the like. In this way, the motors 2 and 3 may drive the driving bevel gears 6 and 7 to rotate by the gear transmission mechanisms and the belt transmission mechanisms.

In the embodiment of the present application, a press ring 34 may be defined between the second planetary carrier 25 and the input pulley 27. The press ring 34 is fixed in the second planetary carrier 25 by a fastener, such as a bolt, both the press ring 34 and the second planetary carrier 25 are mounted in the case 1, and the press ring 34 is configured to support rotation of the second planetary carrier 25.

In an optional implementation, the case 1 of the robot wrist structure 100 is a fork structure, and includes a main body and a connecting member 5. The main body includes a first halve 101 and a second halve 102 that are connected to each other. The first halve 101 and the second halve 102 cooperatively define a chamber for accommodating the first motor 2, the second motor 3, the first transmission mechanism, and the second transmission mechanism. A through hole configured to mount a fastener is defined in the connecting member 5. A groove 104 matching with the connecting member 5 is defined in the first halve 101 and the second halve 102 respectively to reduce the external space occupied by the case 1. The connecting member 5 is disposed in the groove 104 to connect the first halve 101 and the second halve 102 by the fastener.

The case 1 further includes a first strut 105 and a second strut 106 that extend parallelly from both sides of the main body and are oppositely disposed. The first strut 105 is connected to the first halve 101, and the second strut 106 is connected to the second halve 102, for example, by a fastener such as a bolt or the like, or by soldering or the like, which are not limited in the present application. The first driving bevel gear 6 is rotatably mounted on the first strut 105, and the second driving bevel gear 7 is rotatably mounted on the second strut 106. The retaining frame 9 is disposed between the first strut 105 and the second strut 106, and the first driving bevel gear 6 and the second driving gear 7 may drive the retaining frame 9 to rotate about the axis a1. Annular structures 107 which are configured to mount the outer end portions 672 of the driving bevel gears 6 and 7 are defined on the first strut 105 and the second strut 106. Through holes which are configured to avoid the belt transmission mechanisms are defined on the first strut 105 and the second strut 106. The input pulley 27 is fixed on the second planetary carrier 25 and protrudes on outer sides of the first halve 101 and the second halve 102. For a more compact robot wrist structure 100, the through holes on the first strut 105 and the second strut 106 may accommodate the input pulley 27, the output pulley 28, and the transmission belt 29 to facilitate protection of the belt transmission mechanisms.

Optionally, a boss 103 may be defined on the case 1. The boss 103 is configured to be connected to a previous-stage arm structure of the robot wrist structure 100, or to other connecting structures. A plurality of integrated circuit boards 35 are fixed on an outer side of the case 1, and configured to control an input signal and an output signal of the robot wrist structure 100. The robot wrist structure 100 as described above features a compact structure and a small occupied space and volume, and easily achieves robot humanoid wrist movement.

The operating principles of the robot wrist structure 100 in the embodiment of the present application are as follows:

When the motors 2 and 3 start, the output shafts of the motors 2 and 3 drive the driving gear 17 to rotate, the driving gear 17 drives the small gear portion of the dual gear 18 to rotate, then, the larger gear portion of the dual gear 18 drives the transmission gear 19 to rotate, the transmission gear 19 drives the first sun gear 20 to rotate, the first sun gear 20 drives the first planetary gear 21 to rotate, the first planetary gear 21 drives the first planetary carrier 22 to rotate such that the second sun gear 23 in the first planetary carrier 22 accordingly rotates, the second sun gear 23 drives the second planetary gear 24 to rotate, the second planetary gear 24 drives the input pulley 27 to rotate, the input pulley 27 drives the output pulley 28 to rotate by the transmission belt 29, the output pulley 28 drives the driving bevel gears 6 and 7 to rotate, the driving bevel gears 6 and 7 drive the driven bevel gear 8 to rotate, and the driven bevel gear 8 drives the output connecting member 10 to rotate.

When the first motor 2 and the second motor 3 rotate in the same direction and at the same speed, the driven bevel gear 8 drives the retaining frame 9 and the output connecting member 10 to rotate about the axis a1, such that the side swinging movement of the robot wrist about the axis a1 is achieved.

When the first motor 2 and the second motor 3 rotate in different directions and at the same speed, the driven bevel gear 8 drives the output connecting member 10 to rotate about the axis b, such that the pitching movement of the robot wrist about the axis b is achieved.

When the first motor 2 and the second motor 3 rotate in the same direction and at different speeds or in different directions and at different speeds, the driven bevel gear 8 not only drives the retaining frame 9 and the output connecting member 10 to rotate about the axis a1, but also drives the output connecting member 10 to rotate about the axis b. In this way, the coupling movement between the side swinging movement of the robot wrist about the axis a1 and the pitching movement of the robot wrist about the axis b are achieved.

An embodiment of present application further provides a robot. The robot includes the robot wrist structure 100 as described above.

Some exemplary embodiments of the present application are described hereinabove with reference to the accompanying drawings. However, the present application is not limited to the specific details in the above embodiments. Other readily-occurred variations may be made to the technical solutions of the present application without departing from the inventive concept of the present application. These readily-occurred variations shall all fall within the protection scope of the present application.

It should be otherwise noted that all the specific technical features described in the embodiments, in case of no contradiction, may be combined in any suitable fashion. For brevity of description, various possible combinations are not described herein any further in the present application.

In addition, various embodiments of the present application may be randomly combined, as long as the combinations do not go away from the concept of the present application. These combinations may still be considered as the content of the present application.

What is claimed is:

1. A robot wrist structure, comprising:
a case;
a first motor;
a second motor;
a first transmission mechanism;
a second transmission mechanism;
a first driving bevel gear;
a second driving bevel gear;
a driven bevel gear;
a retaining frame; and
an output connecting member,
wherein
the first motor and the second motor are mounted on the case;
the first driving bevel gear, the second driving bevel gear and the driven bevel gear are respectively rotatably mounted in the retaining frame;
an axis of the first driving bevel gear is collinear with an axis of the second driving bevel gear and perpendicularly intersects an axis of the driven bevel gear;
the first driving bevel gear and the second driving bevel gear are both in mesh with the driven bevel gear;
the first motor is connected to the first driving bevel gear by the first transmission mechanism;
the second motor is connected to the second driving bevel gear by the second transmission mechanism; and
the output connecting member is fixedly connected to the driven bevel gear,
wherein
the first transmission mechanism and the second transmission mechanism have the same structure; and
each of the transmission mechanisms comprises a gear transmission mechanism and a belt transmission mechanism,
wherein
the motor, is configured to drive, by the gear transmission mechanism and the belt transmission mechanism in sequence, the driving bevel gear, to rotate,
wherein the gear transmission mechanism comprises a driving gear, a dual gear, a transmission gear, a first planetary gear system, and a second planetary gear system,
wherein
the first planetary gear system comprises a first sun gear, a first planetary gear, a first planetary carrier, and a first ring gear;
the second planetary gear system comprises a second sun gear, a second planetary gear, a second planetary carrier, and a second ring gear;
the belt transmission mechanism comprises an input pulley, an output pulley, and a transmission belt which is disposed around on the input pulley and the output pulley;
the driving gear is connected to an output shaft of the motor;
the dual gear is rotatably mounted in the case;
the driving gear is in mesh with a small gear portion of the dual gear;
a larger gear portion of the dual gear is in mesh with the transmission gear;
the transmission gear is connected to the first sun gear;
the first ring gear and the second ring gear are fixed in the case;
the first planetary carrier and the second sun gear are fixedly connected or integrally formed;
the second planetary carrier is connected to the input pulley; and
the output pulley is connected to the driving bevel gear.

2. The robot wrist structure according to claim 1, wherein
the output connecting member is a U-shaped fork structure; and
the output connecting member comprises a first middle portion; and
a first fork branch and a second fork branch that extend parallelly from both ends of the first middle portion and are oppositely disposed,
wherein
the retaining frame is disposed between the first fork branch and the second fork branch;
the first fork branch is fixedly connected to the driven bevel gear; and
the second fork branch is rotatably connected to the retaining frame.

3. The robot wrist structure according to claim 2, further comprising:
a rotation shaft,
wherein
the rotation shaft is rotatably mounted on the retaining frame;
an axis of the rotation shaft is collinear with the axis of the driven bevel gear; and
the second fork branch is fixedly connected to the rotation shaft.

4. The robot wrist structure according to claim 3, wherein the retaining frame is in a shape of a hexahedron;
a first mounting chamber that is inwardly recessed is defined on a left side face of the retaining frame;
a second mounting chamber that is inwardly recessed is defined on a right side face of the retaining frame;
a third mounting chamber that is inwardly recessed is defined on a front side face of the retaining frame; and
a fourth mounting chamber that is inwardly recessed is defined on a rear side face of the retaining frame,
wherein
the first driving bevel gear is disposed in the first mounting chamber;
the second driving bevel gear is disposed in the second mounting chamber;
the driven bevel gear is disposed in the third mounting chamber; and
the rotation shaft is disposed in the fourth mounting chamber.

5. The robot wrist structure according to claim 1,
wherein
each of the driving bevel gears, comprises an inner end portion which is proximal to a center of the retaining frame;
an outer end portion which is distal from the center of the retaining frame; and
a gear portion which is disposed between the inner end portion and the outer end portion,
wherein
a diameter of the inner end portion is less than a diameter of the outer end portion;
the inner end portion is mounted on the retaining frame by a first bearing; and
the outer end portion is mounted on the case by a second bearing.

6. The robot wrist structure according to claim 1,
wherein
the driven bevel gear comprises an inner end which is proximal to a center of the retaining frame;
an outer end which is distal from the center of the retaining frame; and
a second middle portion which is disposed between the inner end and the outer end,
wherein
gears are defined on the second middle portion;
a diameter of the inner end is less than a diameter of the outer end;
the inner end is mounted on the retaining frame by a third bearing; and
the outer end is mounted on the retaining frame by a fourth bearing.

7. The robot wrist structure according to claim 1,
wherein
the case is a fork structure, and comprises a main body, and a first strut and a second strut that extend parallelly from both sides of the main body and are oppositely disposed,
wherein
the main body comprises a first halve and a second halve;
the first halve and the second halve cooperatively defining a chamber for accommodating the first motor, the second motor, the first transmission mechanism and the second transmission mechanism,
wherein
the first strut is connected to the first halve;
the second strut is connected to the second halve;
the first driving bevel gear is rotatably mounted on the first strut; and
the second driving bevel gear is rotatably mounted on the second strut.

8. A robot, comprising: a robot wrist structure; the robot wrist structure comprising:
a case;
a first motor;
a second motor;
a first transmission mechanism;
a second transmission mechanism;
a first driving bevel gear;
a second driving bevel gear;
a driven bevel gear;
a retaining frame; and
an output connecting member,
wherein
the first motor and the second motor are mounted on the case;
the first driving bevel gear, the second driving bevel gear and the driven bevel gear are respectively rotatably mounted in the retaining frame;
an axis of the first driving bevel gear is collinear with an axis of the second driving bevel gear and perpendicularly intersects an axis of the driven bevel gear;
the first driving bevel gear and the second driving bevel gear are both in mesh with the driven bevel gear;
the first motor is connected to the first driving bevel gear by the first transmission mechanism;
the second motor is connected to the second driving bevel gear by the second transmission mechanism; and
the output connecting member is fixedly connected to the driven bevel gear,
wherein
the first transmission mechanism and the second transmission mechanism have the same structure; and
each of the transmission mechanisms comprises a gear transmission mechanism and a belt transmission mechanism,
wherein
the motor, is configured to drive, by the gear transmission mechanism and the belt transmission mechanism in sequence, the driving bevel gear, to rotate,
wherein
the gear transmission mechanism comprises a driving gear, a dual gear, a transmission gear, a first planetary gear system, and a second planetary gear system,
wherein
the first planetary gear system comprises a first sun gear, a first planetary gear, a first planetary carrier, and a first ring gear;
the second planetary gear system comprises a second sun gear, a second planetary gear, a second planetary carrier, and a second ring gear;
the belt transmission mechanism comprises an input pulley, an output pulley, and a transmission belt which is disposed around on the input pulley and the output pulley;
the driving gear is connected to an output shaft of the motor;
the dual gear is rotatably mounted in the case;
the driving gear is in mesh with a small gear portion of the dual gear;
a larger gear portion of the dual gear is in mesh with the transmission gear;
the transmission gear is connected to the first sun gear;
the first ring gear and the second ring gear are fixed in the case;
the first planetary carrier and the second sun gear are fixedly connected or integrally formed;
the second planetary carrier is connected to the input pulley; and
the output pulley is connected to the driving bevel gear.

9. The robot according to claim 8,
wherein
the output connecting member is a U-shaped fork structure; and
the output connecting member comprises a first middle portion; and
a first fork branch and a second fork branch that extend parallelly from both ends of the first middle portion and are oppositely disposed,
wherein
the retaining frame is disposed between the first fork branch and the second fork branch;
the first fork branch is fixedly connected to the driven bevel gear; and
the second fork branch is rotatably connected to the retaining frame.

10. The robot according to claim 9, further comprising:
a rotation shaft;
wherein
the rotation shaft is rotatably mounted on the retaining frame;
an axis of the rotation shaft is collinear with the axis of the driven bevel gear; and
the second fork branch is fixedly connected to the rotation shaft.

11. The robot according to claim 10,
wherein
the retaining frame is in a shape of a hexahedron;
a first mounting chamber that is inwardly recessed is defined on a left side face of the retaining frame;
a second mounting chamber that is inwardly recessed is defined on a right side face of the retaining frame;
a third mounting chamber that is inwardly recessed is defined on a front side face of the retaining frame; and
a fourth mounting chamber that is inwardly recessed is defined on a rear side face of the retaining frame,
wherein
the first driving bevel gear is disposed in the first mounting chamber;
the second driving bevel gear is disposed in the second mounting chamber;
the driven bevel gear is disposed in the third mounting chamber; and
the rotation shaft is disposed in the fourth mounting chamber.

12. The robot according to claim 8,
wherein
each of the driving bevel gears, comprises an inner end portion which is proximal to a center of the retaining frame;
an outer end portion which is distal from the center of the retaining frame; and
a gear portion which is disposed between the inner end portion and the outer end portion,
wherein
a diameter of the inner end portion is less than a diameter of the outer end portion;
the inner end portion is mounted on the retaining frame by a first bearing; and
the outer end portion is mounted on the case by a second bearing.

13. The robot according to claim 8,
wherein
the driven bevel gear comprises an inner end which is proximal to a center of the retaining frame;
an outer end which is distal from the center of the retaining frame; and
a second middle portion which is disposed between the inner end and the outer end,
wherein
gears are defined on the second middle portion;
a diameter of the inner end is less than a diameter of the outer end;
the inner end is mounted on the retaining frame by a third bearing; and
the outer end is mounted on the retaining frame by a fourth bearing.

14. The robot according to claim 8,
wherein
the case is a fork structure and comprises a main body, and a first strut and a second strut that extend parallelly from both sides of the main body and are oppositely disposed,
wherein
the main body comprises a first halve and a second halve;
the first halve and the second halve cooperatively defining a chamber for accommodating the first motor, the second motor, the first transmission mechanism and the second transmission mechanism,
wherein
the first strut is connected to the first halve;
the second strut is connected to the second halve;
the first driving bevel gear is rotatably mounted on the first strut; and
the second driving bevel gear is rotatably mounted on the second strut.

* * * * *